Dec. 22, 1970     M. F. FERBER     3,548,572
MOWING IMPLEMENT INCLUDING A SERIES OF SLASHING HEADS
Filed Aug. 20, 1968     3 Sheets-Sheet 1

Inventor
Malcolm F. Ferber
By Cushman, Darby & Cushman
Attorneys

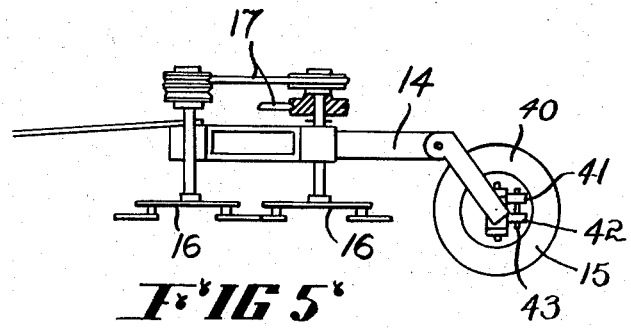
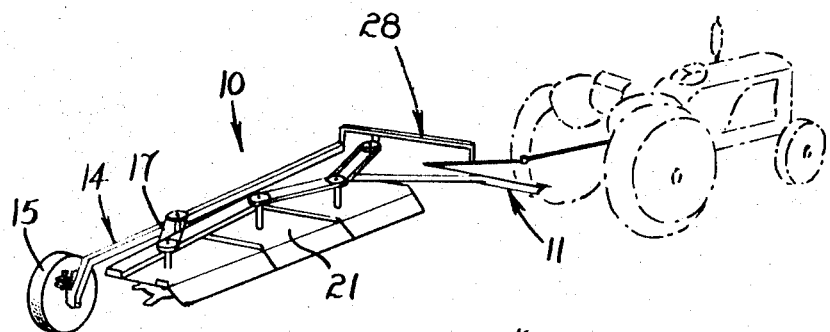

United States Patent Office 3,548,572
Patented Dec. 22, 1970

3,548,572
MOWING IMPLEMENT INCLUDING A SERIES OF SLASHING HEADS
Malcolm F. Ferber, Edward St., Loxton, South Australia, Australia
Filed Aug. 20, 1968, Ser. No. 753,970
Claims priority, application Republic of South Africa, Aug. 21, 1967, 67/4,980
Int. Cl. A01d 57/30
U.S. Cl. 56—192                   7 Claims

ABSTRACT OF THE DISCLOSURE

A mowing implement having a series of slashing heads arranged in groups on each side of a windrow line, the heads of one group rotating in the opposite direction to the heads of the other group.

---

This invention relates to an implement which is useful for mowing of a crop, slashing of weeds and the like.

When fodder crops are to be mown it is frequently desirable for them to be windrowed, and heretofore this has been achieved by means of a throwing device or a scraping device throwing the cut material to one end of an implement or by separate operation with a second implement. This however is unsuitable for implements of considerable width, and one of the main objects of this invention is to provide improvements in mowers whereby a windrow can be more readily formed than with previously proposed mowers.

It has been necessary in many cases to raise and lower slasher heads relative to the ground, and this has been achieved heretofore by raising and lowering the wheels which support a frame carrying the slasher heads, but such raising and lowering has resulted in tilting of the frame, and since slashing heads are of large size and when rotary rotate at relatively high speed, it is found that tilting the heads will tend to disturb a windrow which is otherwise neatly formed by the heads.

The invention may include as a feature an outrigger frame arranged to be towed by a tractor, a series of slashing heads on the outrigger frame, and drive means coupled to the slashing heads, the slashing heads on one side of a windrow line rotating in one direction and on the other side rotating in the opposite direction and being so arranged that material cut by the slashing heads will be directed towards the windrow line.

A further object is to provide control means whereby the pattern of the windrow formed can be controlled, and this is achieved by incorporating tilt control means.

An embodiment of the invention is described hereunder in some detail with reference to and is illustrated in the accompanying drawings, in which:

FIG. 5 is a section on line 5—5 of FIG. 3, and

FIG. 6 is a perspective view showing the machine in its towing position.

Figure 3:
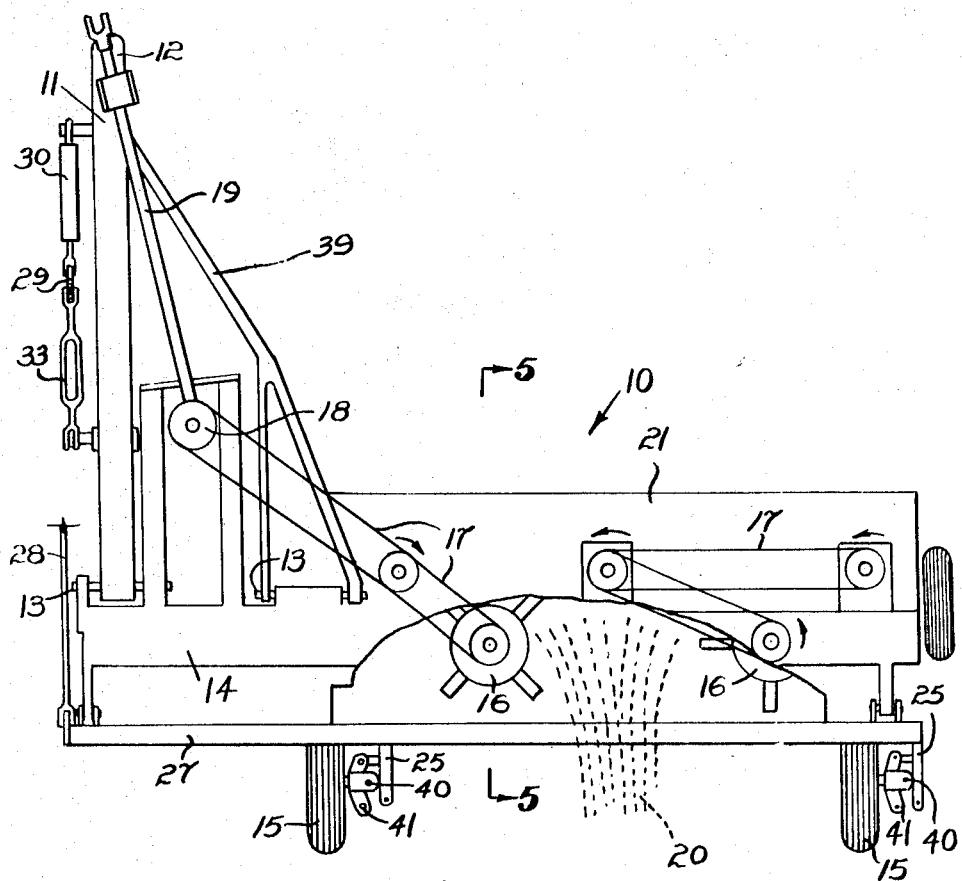
FIG. 3 is a plane view of the machine of FIG. 1.
Figure 4:
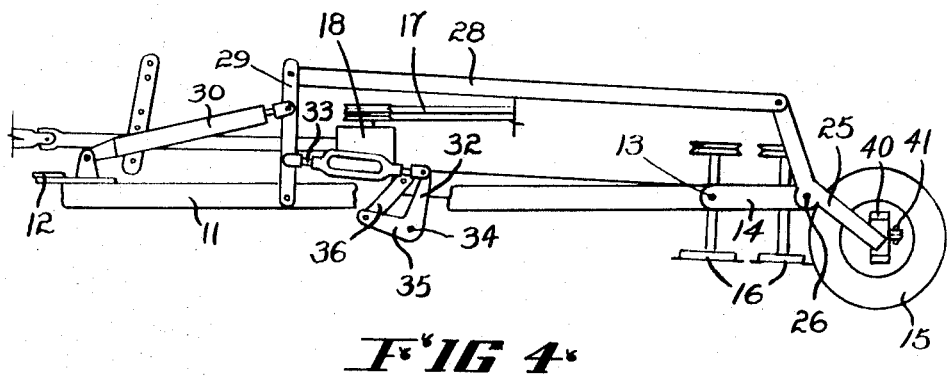
FIG. 4 is a side elevation of the machine, but not showing the drive mechanism for the sake of clarity.

According to this embodiment a combination hay mower and windrower 10 consists of a towing frame 11 provided at its front end with a tractor hitch 12. At its rear end the towing frame 11 is coupled by a pivot 13 to the front end of an outrigger frame 14, the outrigger frame 14 being supported at its rear end by pneumatic tyred wheels 15. The outrigger frame 14 is also provided with a plurality of slasher heads 16 journalled thereto. In this embodiment there are five slasher heads 16 and these are driven by belt drives 17 from the output shaft of a right angled gearbox 18 which itself is coupled to the power take-off of a tractor by a universally jointed telescopic drive shaft 19. These adjacent heads 16 rotate in one direction and the other two, also adjacent, heads in the opposite direction as shown in FIG. 3 to drive the cut vegetation particles rearwardly in the form of a windrow 20. The air drafts from the groups of counter-rotating blades impinge upon one another beneath a shroud 21 to thereby lift the cut particles and avoid chaffing. The slasher head blades are provided with a slight offset to assist this action, and it is found that only about thirty horsepower is absorbed in driving a machine according to this embodiment.

The axles for the wheels 15 are carried on arms 25 which are pivoted near their front and upper ends at 26 to the outrigger frame 14. These arms support a rear frame 27 which is itself coupled by a rear frame link 28 to a front arm 29, the front arm 29 in turn being coupled to the trailing frame by means of a hydraulic cylinder 30 which when operated rocks the front arm 29 and thereby raises or lowers the wheels 15 relative to the outrigger frame 14, in turn lowering or raising the outrigger frame 14 respectively. However, to avoid the outrigger frame tilting when it is raised and lowered, the linkage means 13, which connects the outrigger frame 14 to the trailing frame, includes an intermediate arm 32, which is connected by a lower link 33 to the front arm 29, the intermediate arm being secured to a rocker shaft 34 journalled in bearings in the towing frame 11, the rocker shaft 34 in turn having secured to it a pair of forwardly projecting arms 35 which in turn couple to the outrigger frame 14 by means of upwardly extending links 36. The lower link 33 includes a turnbuckle 37 for adjustment of tilt of the outrigger frame 14, this being an adjustment which it is desirable to make when different crops are being cut.

By adjusting the turnbuckle 37, the plane in which the slasher heads 16 rotate is variable from horizontal to slope upwardly and forwardly, or to slope downwardly and forwardly and this provides a control of air flow which in turn controls windrow configuration.

A diagonally extending stay 39 connects the outrigger frame 14 to the towing frame 11 in such a way that the outrigger will not swing away from its normal disposition as it is drawn over the ground, and the right angle drive gearbox is conveniently located on the outrigger frame 14.

Figure 1:
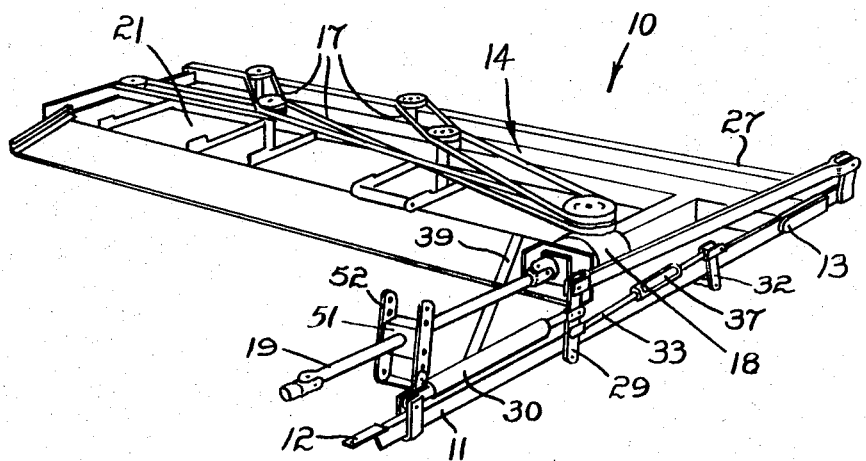
FIG. 1 is a perspective view of a hay mowing machine.
Figure 2:
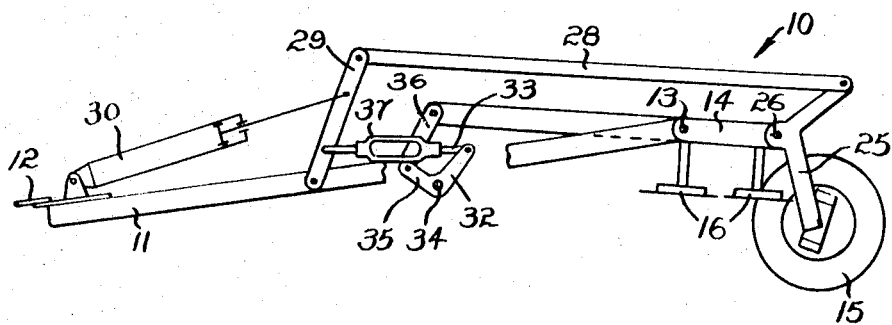
FIG. 2 shows (diagrammatically) the linkage mechanism arrangement whereby tilting of the outrigger frame during raising or lowering is substantially avoided.
Figure 2:
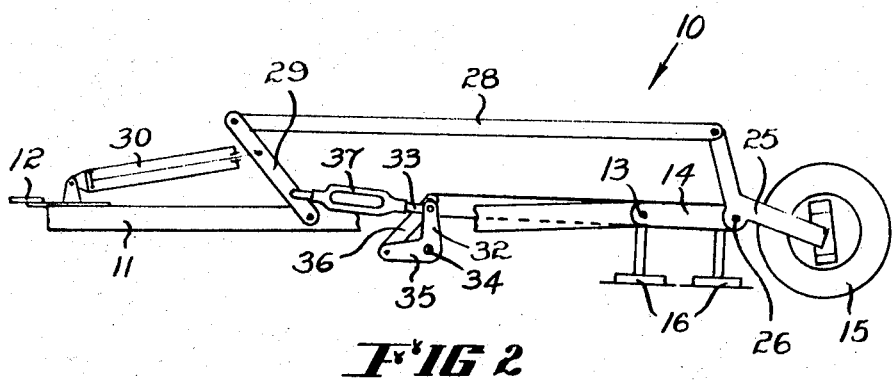

As shown in FIGS. 5 and 6 the wheels 15 are carried on king pins 40 each provided with lugs 41 which selectively align with either one of two lugs 42 and can be locked in either position with locking pins 43, thereby enabling the frame to be towed in its operating position (FIG. 1) or end tow (FIG. 6).

The universally jointed drive shaft 19 is journalled in a bearing 51 which is adjustable for height between a pair of apertured swivel arms 52, so that the machine can articulate relative to a towing tractor, and further, so that tractors of different size can be used.

A brief consideration of the above embodiment will indicate that the invention is very simple and provides a means whereby the frame may be raised and lowered while retained substantially parallel. This prevents the windage due to the rotating slasher heads from disturbing to any considerable extent the configuration of a windrow but the configuration can itself be modified by the tilt control means to provide a light fluffy row which will readily dry. The offset avoids damage to the unmown crop by the tractor wheels. Guides may be used to assist windrow formation if this is desired, but the main control is due to the impinging air streams which are established by the rotating heads, and which carry the cut vegetation with them, the cover plate containing the air flow.

The windrow portion may be adjusted by adjustment of the belts to drive different heads in different directions, and two windrows may be formed if this is desired, but if the machine is used as described in the above embodiment a single windrow can be formed which is arranged to be straddled by a tractor, during its subsequent traverse of the field.

I claim:

1. An implement having a towing frame, an outrigger frame and a rear frame, hinge means between the rear frame and the outrigger frame, the rear frame having wheel arms thereon pivoted to the outrigger frame, wheels carried by the wheel arms, slasher heads journalled in bearings in the outrigger frame, height control means on the towing frame, first link means between the height control means and the rear end of the outrigger frame operable to control height of said rear end by tilting about said hinge means, and second link means between the height control means and the front end of the outrigger frame operable to control height of said front end.

2. An implement according to claim 1 wherein said second link means includes a link with a turnbuckle for control of tilt of the outrigger frame.

3. An implement according to claim 1 further comprising king pins between the wheels and wheel arms, and means between the wheels and wheel arms arranged to lock the wheel arms in either one of two positions to thereby locate the outrigger frame in either an operating position or an end tow position when drawn by a tractor.

4. An implement having a towing frame, an outrigger frame and a rear frame, a front arm hinged to the towing frame, a rear frame link interconnecting the front arm and the rear frame for raising and lowering the rear frame upon movement of the front arm, link means also coupling the front arm to the outrigger frame so arranged that tilting of the outrigger frame during raising or lowering is substantially avoided, a series of slashing heads on the outrigger frame, and drive means driving the slashing heads on one side of a windrow line in one rotational direction and on the other in the other rotational direction arranged so that material being cut by the slashing heads will be directed towards the windrow line.

5. An implement according to claim 4 wherein the link means include an intermediate arm and an upwardly extending link hinged at its lower end to the intermediate arm and at its upper end to the forward end of the outrigger frame, and a further link interconnects the front arm to the intermediate arm, the further link including a turnbuckle for variation of the length thereof and thereby for variation of tilt of the slasher heads.

6. An implement according to claim 4 wherein the link means include an intermediate arm and an upwardly extending link hinged at its lower end to the intermediate arm and at its upper end to the forward end of the outrigger frame, and a further link interconnects the front arm to the intermediate arm.

7. An implement having a towing frame, an outrigger frame and a rear frame, a front arm hinged to the towing frame, a hydraulic cylinder operative between the towing frame and the front arm, a rear frame link interconnecting the front arm and the rear frame for raising and lowering the rear frame upon movement of the front arm, link means also coupling the front arm to the outrigger frame so arranged that tilting of the outrigger frame during raising or lowering is substantially avoided, a series of slashing heads on the outrigger frame, and drive means driving the slashing heads on one side of a windrow line in one rotational direction and on the other in the other rotational direction arranged so that material being cut by the slashing heads will be directed towards the windrow line.

References Cited

UNITED STATES PATENTS

| | | | |
|---|---|---|---|
| 2,354,962 | 8/1944 | Oehler et al. | 56—23 |
| 2,609,649 | 9/1952 | Watson | 56—208X |
| 2,688,833 | 9/1954 | Weiss et al. | 56—25.4 |
| 2,817,943 | 12/1957 | Collins | 56—208 |
| 3,157,014 | 11/1964 | Bottenberg | 56—6 |

LOUIS G. MANCENE, Primary Examiner

J. N. ESKOVITZ, Assistant Examiner

U.S. Cl. X.R.

56—208